(12) United States Patent
Ko et al.

(10) Patent No.: US 10,049,792 B2
(45) Date of Patent: Aug. 14, 2018

(54) SUPERCONDUCTING TAPE CURRENT LEADS

(71) Applicant: INDUSTRY-ACADEMIC COOPERATION FOUNDATION, YONSEI UNIVERSITY, Seoul (KR)

(72) Inventors: Tae Kuk Ko, Seoul (KR); Woo Seung Lee, Gyeonggi-do (KR); Hyun Chul Jo, Seoul (KR); Young Jin Hwang, Incheon (KR); Ji Ho Lee, Gyeonggi-do (KR); Seok Ho Nam, Chungcheongbuk-do (KR)

(73) Assignee: Industry-Academic Cooperation of Yonsei University, Seoul (KR)

( * ) Notice: Subject to any disclaimer, the term of this patent is extended or adjusted under 35 U.S.C. 154(b) by 223 days.

(21) Appl. No.: 14/915,502

(22) PCT Filed: Sep. 30, 2013

(86) PCT No.: PCT/KR2013/008758
§ 371 (c)(1),
(2) Date: Feb. 29, 2016

(87) PCT Pub. No.: WO2015/030292
PCT Pub. Date: Mar. 5, 2015

(65) Prior Publication Data
US 2016/0217889 A1 Jul. 28, 2016

(30) Foreign Application Priority Data

Aug. 30, 2013 (KR) .................. 10-2013-0104089

(51) Int. Cl.
*H01B 12/06* (2006.01)
*H01R 4/00* (2006.01)
(Continued)

(52) U.S. Cl.
CPC .......... *H01B 12/06* (2013.01); *H01B 7/0846* (2013.01); *H01R 4/68* (2013.01); *Y02E 40/642* (2013.01)

(58) Field of Classification Search
CPC .......... H01B 12/00–12/06; H01B 7/00–7/0846
See application file for complete search history.

(56) References Cited

U.S. PATENT DOCUMENTS

| 6,069,395 A | 5/2000 | Yamaguchi et al. |
| 6,794,579 B1 | 9/2004 | Caracino et al. |
| 2012/0309631 A1 | 12/2012 | Arndt et al. |

FOREIGN PATENT DOCUMENTS

| JP | 200585612 | 3/2005 |
| JP | 20092303913 | 10/2009 |

(Continued)

OTHER PUBLICATIONS

Machine translation of JP2009230913, published Oct. 2009, pp. 1-7.*

(Continued)

*Primary Examiner* — Colleen P Dunn
(74) *Attorney, Agent, or Firm* — Brian J. Colandreo; Michael T. Abramson; Holland & Knight LLP (57) ABSTRACT

Provided is a current lead wire using a superconducting tape. The current lead wire may comprise a first superconducting tape that electrically connects the first terminal and the second terminal; a second superconducting tape that is arranged in parallel with the first superconducting tape to electrically connect the first terminal with the second terminal; and a third superconducting tape that electrically connects the first superconducting tapes with the second superconducting tape.

5 Claims, 4 Drawing Sheets

(51) Int. Cl.
    *H01R 4/68*    (2006.01)
    *H01B 7/08*    (2006.01)

(56)         References Cited

FOREIGN PATENT DOCUMENTS

JP      201228041      2/2012
KR      100360292      6/2002
KR      100666962      4/2007

OTHER PUBLICATIONS

Machine translation of JP2012028041, published Feb. 2012, pp. 1-16.*
International Search Report dated Apr. 29, 2014 from International Application Serial No. PCT/KR2013/008758 (2 pages).

* cited by examiner

SUPERCONDUCTING TAPE CURRENT LEADS

CROSS-REFERENCE TO RELATED APPLICATIONS

This application is a U.S. National Stage of International Patent Application No. PCT/KR2013/008758, filed 30 Sep. 2013, which claims priority from Korean Patent Application No. 10-2013-0104089 filed on Aug. 30, 2013 in the Korean Intellectual Property Office, the disclosure of which is incorporated herein by reference in its entirety.

This application claims priority from Korean Patent Application No. 10-2013-0104089 filed on Aug. 30, 2013 in the Korean Intellectual Property Office, the disclosure of which is incorporated herein by reference in its entirety.

BACKGROUND OF THE INVENTION

1. Field of the Invention

The present invention relates to a current lead wire using a superconducting tape, and more particularly, to a current lead wire using a superconducting tape with improved stability of current supply.

2. Description of the Related Art

A superconducting system minimizes a loss of current, using a superconducting material that exhibits characteristics of impedance similar to zero at a cryogenic critical temperature or lower. The general superconducting system is equipped with a superconducting current lead wire to supply a large amount of current to a cryogenic superconducting device from a power supply unit of a normal temperature environment.

The superconducting current lead wire includes a plurality of superconducting tapes which connects the power supply unit and the superconducting device, and the superconducting tape includes a high temperature superconducting material having a critical temperature of about 30K or higher.

In order that the superconducting tape has a uniform current density distribution, although the plurality of superconducting tapes which connects the power supply unit and the superconducting device needs to have uniform characteristics, all the plurality of superconducting tapes is realistically difficult to have the uniform characteristics.

For example, due to the slightly different critical current values, the damage of the superconducting tape itself and the differences in the cooling uniformity of the superconducting tape for each of the produced superconducting tapes, some superconducting tapes lose superconductivity and a quench occurs.

Therefore, various studies for suppressing and detecting an occurrence of quench in the superconducting current lead wire in the superconducting system have been developed.

Patent Document 1 KR 10-1091194 B1

SUMMARY OF THE INVENTION

Aspects of the present invention provide a current lead wire using a superconducting tape that can stably maintain the current supply, by allowing the current to bypass when a problem occurs in some superconducting tapes among the plurality of superconducting tapes constituting the current lead wires.

However, aspects of the present invention are not restricted to the one set forth herein. The above and other aspects of the present invention that have not been mentioned will become more apparent to one of ordinary skill in the art to which the present invention pertains by referencing the detailed description of the present invention given below.

According to the embodiments of the present invention, there are at least the following effects.

It is possible to stably maintain the current supply, by allowing the current to bypass, when a problem occurs in some superconducting tapes among the plurality of superconducting tapes constituting the current lead wires.

The effects of the present invention are not limited by the contents illustrated above, and further various effects are included herein.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Features of the inventive concept and methods of accomplishing the same may be understood more readily by reference to the following detailed description of preferred embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims.

In the drawings, the thickness of layers and regions are exaggerated for clarity. As used herein, the term "and/or" includes any and all combinations of one or more of the associated listed items.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Hereinafter, the present invention will be described with reference to the drawings for explaining the current lead wire using the superconducting tape according to the embodiment of the present invention.

Figure 1:
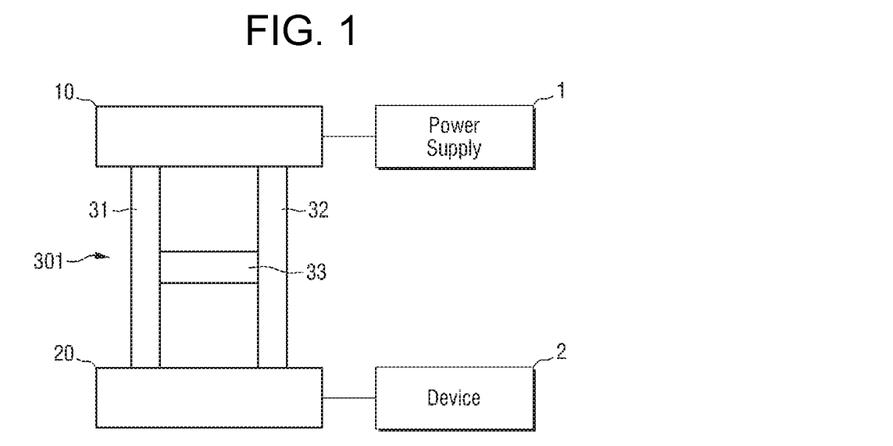
FIG. 1 is a diagram schematically illustrating a current lead wire using a superconducting tape according to a first embodiment of the present invention.
Figure 2:
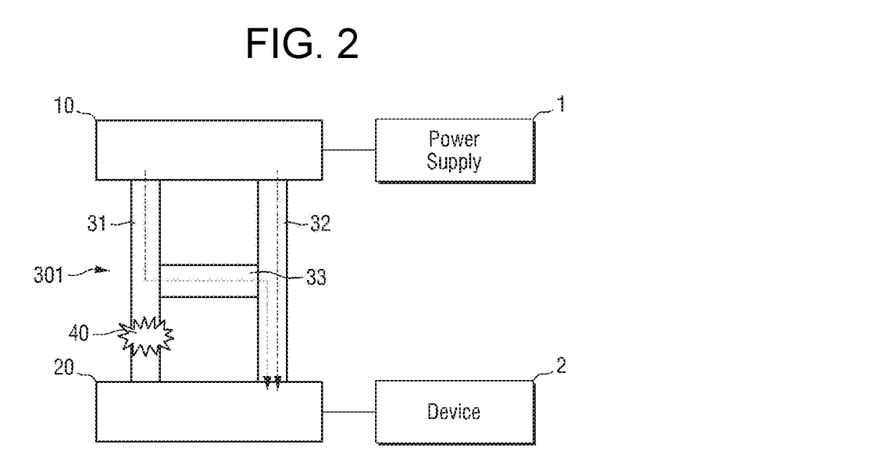
FIG. 2 is a diagram illustrating a state in which the current is supplied to bypass when a problem occurs in some superconducting tapes among the current lead wire using the superconducting tape according to the first embodiment of the present invention.

FIG. 1 is a diagram schematically illustrating a current lead wire using a superconducting tape according to a first embodiment of the present invention, and FIG. 2 is a diagram illustrating a state in which the current is supplied to bypass when a problem occurs in some superconducting tapes among the current lead wire using the superconducting tape according to the first embodiment of the present invention.

As illustrated in FIG. 1, a current lead wire using a superconducting tape 301 according to the first embodiment of the present invention includes a first superconducting tape 31, a second superconducting tape 32 and a third superconducting tape 33.

The first superconducting tape 31 and the second superconducting tape 32 electrically connect a first terminal 10 and a second terminal 20.

The first terminal 10 is connected to a power supply unit 1 provided in an environment of a normal temperature 300K. The first terminal 10 is a terminal that supplies a current from the power supply unit 1.

The second terminal 20 is connected to a superconducting device 2 provided in a low temperature environment. The second terminal 20 is a terminal that supplies a current to the superconducting device 2. The low temperature environment in which the superconducting device 2 is provided is a cryogenic environment in which the superconducting device and the superconducting tapes 31, 32 and 33 maintain the superconductivity, and may be an environment within a temperature range of about 30K to 150K.

The first superconducting tape 31 and the second superconducting tape 32 are in parallel, while being spaced apart from each other, to electrically connect the first terminal 10 and the second terminal 20, respectively. For convenience of explanation, although only the first superconducting tape 31 and the second superconducting tape 32 are illustrated as the superconducting tape that connects the first terminal 10 and the second terminal, the plurality of first superconducting tapes 31 and the plurality of second superconducting tapes 32 may be provided.

The third superconducting tape 33 is connected to the first superconducting tape 31 at one end and is connected to the second superconducting tape 32 at the other end to electrically connect the first superconducting tape 31 and the second superconducting tape 32.

When the first superconducting tape 31 and the second superconducting tape 32 normally maintain the superconductivity, the current provided by the power supply unit 1 is supplied to the superconducting device 2 through the first superconducting tape 31 and the second superconducting tape 32.

Further, as illustrated in FIG. 2, when a quench 40 occurs in a part of the first superconducting tape 31 that is one of the first superconducting tape 31 and the second superconducting tape 32 for connecting the first terminal 10 with the second terminal 20, the current flowing through the first superconducting tape 31 is supplied to the second superconducting tape 32 by bypassing through the third superconducting tape 33.

Conversely, when a quench 40 occurs in a part of the second superconducting tape 32, the current flowing through the second superconducting tape 32 is supplied to the first superconducting tape 33 by bypassing through the third superconducting tape through 31.

Therefore, even when a problem such as a quench 40 occurs in any one of the first superconducting tape 31 and the second superconducting tape 32, since the current can bypass to the normal superconducting tapes through the third superconducting tape 33 that connects the first superconducting tape 31 and the second superconducting tape 32, it is possible to stably supply the current.

Hereinafter, a current lead wire using a superconducting tape according to a second embodiment of the present invention will be described. For the convenience of description, the parts similar the first embodiment are denoted by the same reference numerals, and the description of the parts common to the first embodiment will not be provided.

Figure 3:
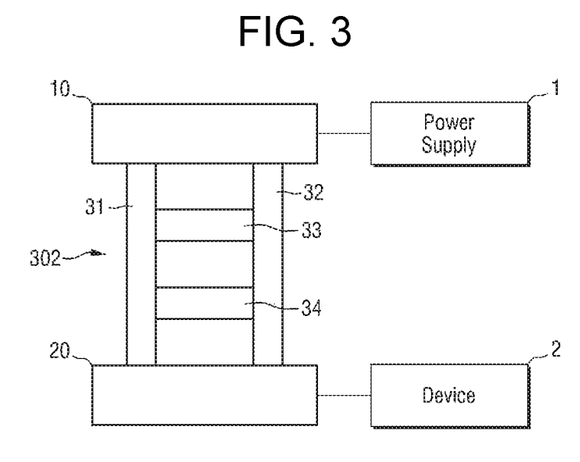
FIG. 3 is a diagram schematically illustrating a current lead wire using a superconducting tape according to a second embodiment of the present invention.
Figure 4:
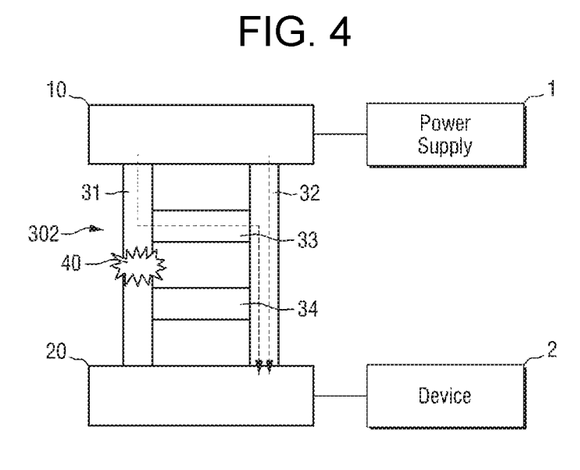
FIG. 4 is a diagram illustrating a state in which the current is supplied to bypass when a problem occurs in some superconducting tapes among the current lead wire using the superconducting tape according to the second embodiment of the present invention.

FIG. 3 is a diagram schematically illustrating a current lead wire using a superconducting tape according to a second embodiment of the present invention, and FIG. 4 is a diagram illustrating a state in which the current is supplied to bypass when a problem occurs in some superconducting tapes among the current lead wire using the superconducting tapes according to the second embodiment of the present invention.

As illustrated in FIG. 3, a current lead wire using a superconducting tape 302 according to the present embodiment further includes a fourth superconducting tape 34, in addition to the first superconducting tape 31, the second superconducting tape 32 and the third superconductor tape 33.

Similarly to the third superconducting tape 33, the fourth superconducting tape 34 is connected to the first superconducting tape 31 at one end and is connected to the second superconducting tape 32 at the other end to electrically connect the first superconducting tape 31 with the second superconducting tape 32. The fourth superconducting tape 34 is disposed to maintain a constant distance from the third superconducting tape 33.

As in the above-described first embodiment, when the first superconducting tape 31 and the second superconducting tape 32 normally maintain the superconductivity, the current provided by the power supply unit 1 is supplied to the superconducting device 2 through the first superconducting tape 31 and the second superconducting tape 32.

Further, as illustrated in FIG. 4, when a quench 40 occurs in a part of the first superconducting tape 31 that is one of the first superconducting tape 31 and the second superconducting tape 32 for connecting the first terminal 10 with the second terminal 20, the current flowing through the first superconducting tape 31 may be supplied to the second superconducting tape 32, by bypassing through the third superconducting tape 33 and/or the fourth superconducting tape 34.

For example, as illustrated in FIG. 4, the quench 40 occurs between a connection point with the third superconducting tape 33 and a connection point with the fourth superconducting tape 34 on the first superconducting tape 31, the current flowing to the first superconducting tape 31 is supplied to the second superconducting tape 32 by bypassing through the third superconducting tape 33.

As illustrated in FIG. 4, the current bypassed to the second superconducting tape 32 through the third superconducting tape 33 may be supplied to the second terminal 20 through the second superconducting tape 32. Alternatively, the current may be supplied to the second terminal 20 by flowing again to first superconducting tape 31 through the fourth superconducting tape 34.

Although it is not illustrated, when the quench 40 occurs between the connection point with the fourth superconductor tape 34 and the second terminal 20 on the first superconducting tape 31, the current flowing to the first superconducting tape 31 is supplied to the second terminal 20 by bypassing to the second superconducting tape 32 through the fourth superconducting tape 34.

Conversely, even when the quench 40 occurs in a part of the second superconducting tape 32, the current flowing through the superconducting tape 32 is supplied to the second terminal 20 by bypassing to the first superconducting tape 31 through the third superconducting tape 33 and/or the fourth superconducting tape 34.

Therefore, even when a problem such as the quench 40 occurs in one of the first superconducting tape 31 and the second superconducting tape 32, since the current can bypass to the normal superconducting tape through the third superconducting tape 33 and/or the fourth superconducting tape 34 that connect the first superconducting tape 31 with the second superconducting tape 32, it is possible to stably supply the current.

Hereinafter, a current lead wire using a superconducting tape according to a third embodiment of the present invention will be described. For the convenience of description, the parts similar to the second embodiment are denoted by the same reference numerals, and the description of the parts common to the second embodiment will not be provided.

Figure 5:
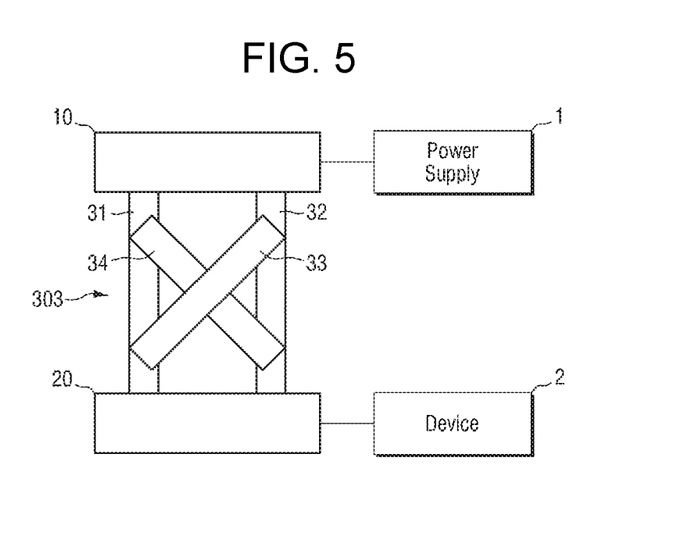
FIG. 5 is a diagram schematically illustrating a current lead wire using a superconducting tape according to a third embodiment of the present invention.
Figure 6:
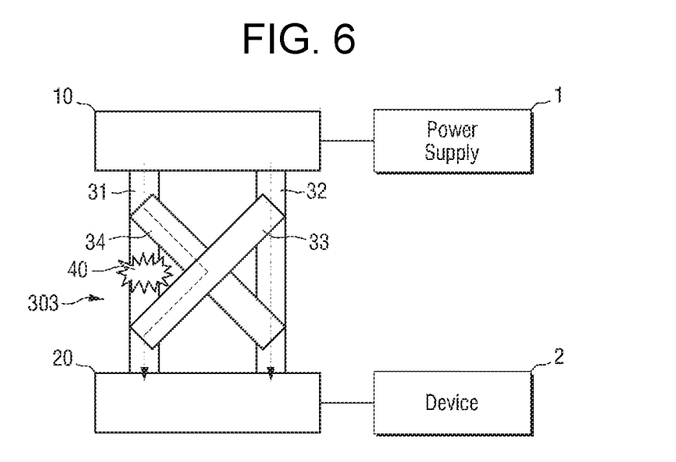
FIG. 6 is a diagram illustrating a state in which the current is supplied to bypass when a problem occurs in some superconducting tapes among the current lead wire using the superconducting tape according to the third embodiment of the present invention.

FIG. 5 is a diagram schematically illustrating a current lead wire using a superconducting tape according to a third embodiment of the present invention, and FIG. 6 is a diagram illustrating a state in which the current is supplied to bypass when a problem occurs in some superconducting tapes among the current lead wire using the superconducting tapes according to the third embodiment of the present invention.

As illustrated in FIG. 5, a current lead wire using a superconducting tape 303 according to the present embodiment includes a first superconducting tape 31, a second superconducting tape 32, a third superconducting tape 33 and a fourth superconducting tape 34.

However, unlike the current lead wire using the superconducting tape 302 according to the second embodiment as described above, the current lead wire using the superconducting tape 303 according to the present embodiment is provided so that the third superconducting tape 33 and the fourth superconducting tape 34 intersect with each other. Further, the third superconducting tape 33 and the fourth superconducting tape 34 are electrically connected to each other at the intersection points.

As in the first embodiment and the second embodiment described above, when the first superconducting tape 31 and the second superconducting tape 32 normally maintain the superconductivity, the current provided by the power supply unit 1 is supplied to the superconducting device 2 through the first superconducting tape 31 and the second superconducting tape 32.

Further, as illustrated in FIG. 6, when the quench 40 occurs in a part of the first superconducting tape 31 that is one of the first superconducting tape 31 and the second superconducting tape 32 for connecting the first terminal 10 with the second terminal 20, the current flowing through the first superconducting tape 31 may be supplied to the second superconducting tape 32 by bypassing through the third superconducting tape 33 and/or the fourth superconducting tape 34.

For example, as illustrated in FIG. 6, when the quench 40 occurs between the connection point with the third superconducting tape 33 and the connection point with the fourth superconducting tape 34 on the first superconducting tape 31, the current flowing to the first superconducting tape 31 flows to the fourth superconducting tape 34, flows to the third superconducting tape 33 at the intersection point between the third superconducting tape 33 and the fourth superconducting tape 34, and may be supplied to the second terminal 20 again through the first superconducting tape 31.

Alternatively, the current flowing through the fourth superconducting tape 34 may be supplied to the second terminal 20 via the second superconducting tape 32 through the fourth superconducting tape 34, rather than flowing to the third superconducting tape 33 side.

Although it is not illustrated, when the quench 40 occurs between the connection point with the third superconducting tape 33 and the second terminal 20 on the first superconducting tape 31, the current flowing to the first superconducting tape 31 is supplied to the second terminal 20 by bypassing to the second superconducting tape 32 through the third superconducting tape 33.

Conversely, even when the quench 40 occurs in a part of the second superconducting tape 32, the current flowing through the second superconducting tape 32 is supplied to the second terminal 20 by bypassing through the third superconducting tape 33 and/or the fourth superconducting tape 34.

Therefore, even when a problem such as the quench 40 occurs in one of the first superconducting tape 31 and the second superconducting tape 32, since the current can bypass to the normal superconducting tape through the third superconducting tape 33 and/or the fourth superconductor tape 34 which connect the first superconducting tape 31 with the second superconducting tape 32, it is possible to stably supply the current.

Hereinafter, a current lead wire using a superconducting tape according to a fourth embodiment of the present invention fourth will be described. For the convenience of description, the parts similar to the second embodiment are denoted by the same reference numerals, and the description of the parts common to the second embodiment will not be provided.

Figure 7:
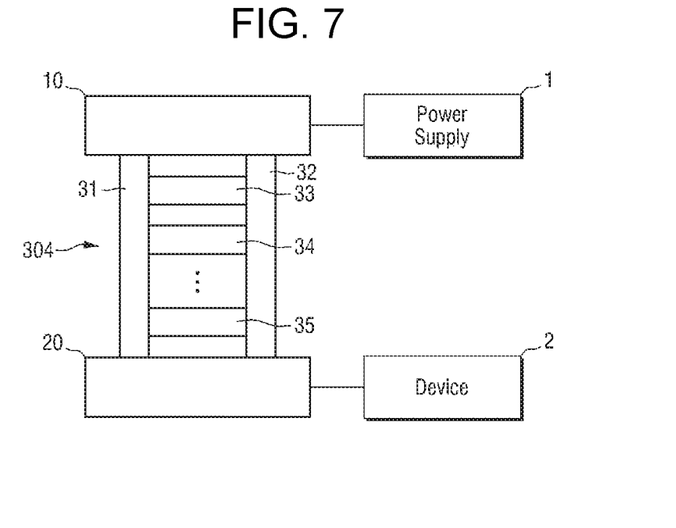
FIG. 7 is a diagram schematically illustrating a current lead wire using a superconducting tape according to a fourth embodiment of the present invention.

FIG. 7 is a diagram schematically illustrating a current lead wire using a superconducting tape according to a fourth embodiment of the present invention.

As illustrated in FIG. 7, a current lead wire using a superconducting tape 304 according to the present embodiment further includes a fifth superconducting tape 35, in addition to the first superconducting tape 31, the second superconducting tape 32, the third superconducting tape 33 and the fourth superconducting tape 34.

Similarly to the third superconducting tape 33 and the fourth superconducting tape 34, the fifth superconducting tape 35 is connected to the first superconducting tape 31 at one and is connected to the second superconducting tape 32 at the other end one to electrically connect the first superconducting tape 31 with the second superconducting tape 32. Further, the fifth superconducting tape 35 is disposed to maintain a constant distance from the fourth superconducting tape 34.

A plurality of fifth superconducting tapes 35 may be provided, and the plurality of fifth superconducting tapes 35 may be disposed to maintain constant intervals.

In the current lead wire using the superconducting tape 304 according to the present embodiment, since a plurality of superconducting tapes 33, 34 and 35 which electrically connects the first superconducting tape 31 with the second superconducting tape 32 is disposed at constant intervals, even when the quench 40 occurs in any one part of the first superconducting tape 31 and the second superconducting tape 32, the current is allowed to bypass by the superconducting tapes 33, 34 and 35 which electrically connect the first superconducting tape 31 and the second superconducting tape 32 at a position adjacent to the occurrence point of quench, and thus, the current is stably supplied.

Since the bypass state of current has been described in the above-described second embodiment, the repeated explanation thereof will not be provided.

Hereafter, a current lead wire using a superconducting tape according to a fifth embodiment of the present invention will be described. For the convenience of description, the parts similar to the third embodiment are denoted by the same reference numerals, and the description of the parts common to the third embodiment will not be provided.

Figure 8:
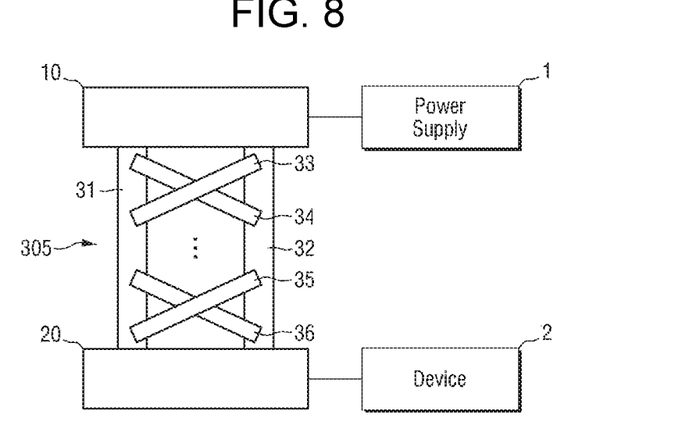
FIG. 8 is a diagram schematically illustrating a current lead wire using a superconducting tape according to a fifth embodiment of the present invention.

FIG. 8 is a diagram schematically illustrating a current lead wire using a superconducting tape according to a fifth embodiment of the present invention.

As illustrated in FIG. 8, a current lead wire using a superconducting tape 305 according to the present embodiment further includes a fifth superconducting tape 35 and a sixth superconducting tape 36 intersecting with each other, in addition to the first superconducting tape 31, the second superconducting tape 32, the third superconducting tape 33 and the fourth superconducting tape 34.

The superconducting tape 35 and the sixth superconducting tape 36 are provided in the same manner as the third superconducting tape 33 and the fourth superconducting tape 34 provided to intersect with each other in the above-mentioned the third embodiment.

That is, each of the fifth superconducting tape 35 and the sixth superconducting tape 36 electrically connects the first superconducting tape 31 and the second superconducting tape 32 to each other and intersects with each other, and at the intersection point, the fifth superconducting tape 35 and the sixth superconducting tape 36 are electrically connected to each other.

A pair of superconducting tapes provided to intersect with each other may be further provided between the third superconducting tape 33 and the fourth superconducting tape 34, and between the fifth superconducting tape 35 and the sixth superconducting tape 36.

In the current lead wire using the superconducting tape 305 according to the present embodiment, since a plurality of superconducting tapes 33, 34, 35 and 36 which electrically connects the first superconducting tape 31 with the second superconducting tape 32 and intersects with each other is disposed at constant intervals, even when the quench 40 occurs in any one part of the first superconducting tape 31 and the second superconducting tape 32, the current is allowed to bypass by the superconducting tapes 33, 34, 35 and 36 which electrically connect the first superconducting tape 31 and the second superconducting tape 32 at a position adjacent to the occurrence point of quench, and thus, the current is stably supplied.

Since the bypass state of current has been described in the above-described third embodiment, the repeated description thereof will not be provided.

The current lead wire using the superconducting tape according to the present invention described through various embodiments may stably maintain the current supply by allowing the current to bypass, using at least one superconducting tapes 33, 34, 35 and 36 that connect the first terminal 10 of the power supply unit 1 side with the second terminal 20 of the cryogenic device 2 side to electrically connect the first superconducting tape 31 and the second superconducting tape 32 that transmit the current supplied from the power supply unit 1 to the cryogenic device 2, even when a problem occurs in any one of the first superconducting tape 31 and the second superconducting tape 32.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A current lead wire using a superconducting tape that connects a first terminal and a second terminal with each other, the current lead wire comprising:

a first superconducting tape that electrically connects the first terminal and the second terminal;
a second superconducting tape that is arranged in parallel with the first superconducting tape to electrically connect the first terminal with the second terminal;
a third superconducting tape that electrically connects the first superconducting tapes with the second superconducting tape; and
a fourth superconducting tape that electrically connects the first superconducting tape with the second superconducting tape,
wherein the third superconducting tape and the fourth superconductor tape are disposed to be spaced apart from each other.

2. The current lead wire using the superconducting tape of claim 1, wherein the third superconducting tape and the fourth superconductor tape are disposed to intersect with each other.

3. The current lead wire using the superconducting tape of claim 2, wherein the third superconducting tape and the fourth superconductor tapes are electrically connected with each other at the intersection points.

4. The current lead wire using the superconducting tape of claim 1, wherein the first superconducting tape, the second superconducting tape and the third superconducting tape are high-temperature superconducting tapes.

5. The current lead wire using the superconducting tape of claim 1, wherein the first terminal is connected to a power supply unit of an ambient temperature, and the second terminal is connected to a cryogenic device of the low temperature.

* * * * *